United States Patent
Lutze et al.

(10) Patent No.: US 10,347,948 B2
(45) Date of Patent: Jul. 9, 2019

(54) DEVICE FOR PROVIDING AN ELECTRICAL VOLTAGE AS WELL AS DRIVE ARRANGEMENT AND METHOD

(71) Applicant: Siemens Aktiengesellschaft, München (DE)

(72) Inventors: Marcel Lutze, Nürnberg (DE); Dragan Mikulec, Erlangen (DE); Timur Werner, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 412 days.

(21) Appl. No.: 14/790,797

(22) Filed: Jul. 2, 2015

(65) Prior Publication Data

US 2016/0006080 A1    Jan. 7, 2016

(30) Foreign Application Priority Data

Jul. 3, 2014   (DE) .......................... 10 2014 212 930

(51) Int. Cl.
| | | |
|---|---|---|
| *H01M 10/42* | (2006.01) | |
| *H02M 7/48* | (2007.01) | |
| *H02M 1/00* | (2006.01) | |

(52) U.S. Cl.
CPC ..... *H01M 10/4207* (2013.01); *H01M 10/425* (2013.01); *H02M 7/48* (2013.01);
(Continued)

(58) Field of Classification Search
None
See application file for complete search history.

(56) References Cited

U.S. PATENT DOCUMENTS

| | | | | |
|---|---|---|---|---|
| 2007/0009770 A1* | 1/2007 | Takada | ................ | H01M 16/006 429/9 |
| 2010/0264740 A1* | 10/2010 | Lee | ....................... | H02J 7/0016 307/80 |

(Continued)

FOREIGN PATENT DOCUMENTS

| | | |
|---|---|---|
| CN | 101729020 | 6/2010 |
| CN | 102612794 | 7/2012 |

(Continued)

OTHER PUBLICATIONS

Chinese Search Report dated Apr. 19, 2017 with respect to counterpart Chinese patent application 20151038246291.

*Primary Examiner* — Alix E Eggerding
(74) *Attorney, Agent, or Firm* — Henry M. Feiereisen LLC (57) ABSTRACT

A device supplying an electrical voltage from a battery system includes a series connection composed of a first battery submodule supplying a first battery submodule voltage and at least one second battery submodule supplying a second battery submodule voltage, a first voltage conversion module receiving the first battery submodule voltage and converting the first battery submodule voltage into an AC output voltage to be supplied to an electrical component connected to the first voltage conversion module, and a coupling device electrically connecting the first voltage conversion module to the first battery submodule and to the at least one second battery submodule such that the first voltage conversion module receives a sum voltage composed of the first battery submodule voltage and the second battery submodule voltage.

9 Claims, 4 Drawing Sheets

(52) U.S. Cl.
CPC .......................... *H02M 2001/007* (2013.01);
*H02M 2001/008* (2013.01); *H02M 2001/0074* (2013.01)

(56) References Cited

U.S. PATENT DOCUMENTS

| | | | |
|---|---|---|---|
| 2010/0289447 A1* | 11/2010 | Dobson | H01M 10/46 320/101 |
| 2012/0074907 A1 | 3/2012 | Roeper | |
| 2013/0257321 A1 | 10/2013 | Butzmann | |
| 2014/0365792 A1* | 12/2014 | Yun | G06F 1/3212 713/320 |

FOREIGN PATENT DOCUMENTS

| | | |
|---|---|---|
| DE | 102009027833 | 1/2011 |
| DE | 102011077708 A1 | 12/2012 |
| EP | 2608397 A1 | 6/2013 |
| WO | WO 2004073157 A2 | 8/2004 |

* cited by examiner

DEVICE FOR PROVIDING AN ELECTRICAL VOLTAGE AS WELL AS DRIVE ARRANGEMENT AND METHOD

CROSS-REFERENCES TO RELATED APPLICATIONS

This application claims the priority of German Patent Application, Serial No. 10 2014 212 930.3, filed Jul. 3, 2014, pursuant to 35 U.S.C. 119(a)-(d), the content of which is incorporated herein by reference in its entirety as if fully set forth herein.

BACKGROUND OF THE INVENTION

The present invention relates to a device for providing an electrical voltage using a battery system including a series connection consisting of a first battery submodule for providing a first battery submodule voltage and a second battery submodule for providing a second battery submodule voltage and with a first voltage conversion module for converting the first battery submodule voltage into an output voltage, which can be supplied to an electrical component that can be connected to the voltage conversion module. The invention additionally relates to a drive arrangement and a method.

The following discussion of related art is provided to assist the reader in understanding the advantages of the invention, and is not to be construed as an admission that this related art is prior art to this invention.

Devices for providing an electrical voltage normally include an electrical energy store, which can for example be designed as a battery system. Such battery systems can be used to supply electrical loads, for example electrical machines, with energy. Such electrical machines can for example be arranged in motor vehicles and used to drive the motor vehicle. Electrical energy stores can however also be used as buffers for electrical energy. In this case electrical energy is provided by an electrical machine in generator mode and is buffered in the electrical energy store. Such electrical energy stores are known from wind turbines, for example.

One or more electrical loads can be connected to the battery system, and are supplied with electrical energy by the battery system. Since the voltage provided by the battery system is not equally suitable for all electrical loads, the electrical energy is normally transmitted from the battery system to the electrical load or loads via one or more voltage transformers.

Figure 1:
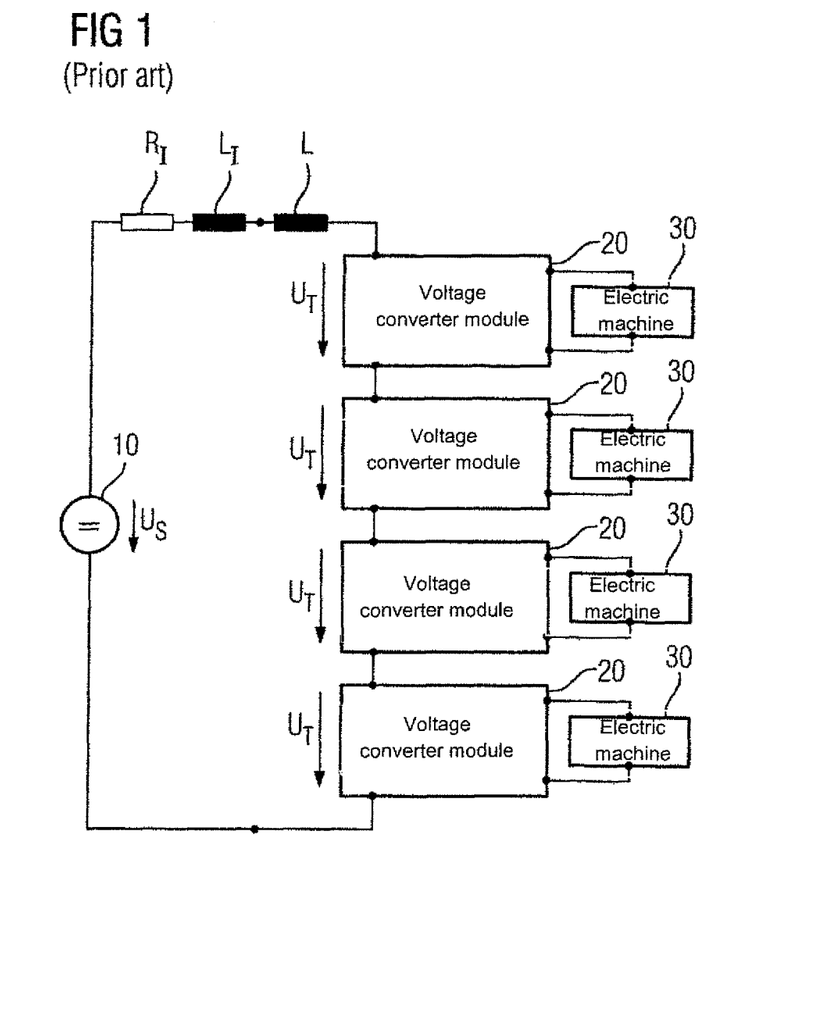
FIG. 1 shows a schematic diagram of a circuit arrangement for supplying voltage in accordance with the prior art.

A circuit arrangement according to the prior art is illustrated in FIG. 1. Here a battery system 10 with an internal resistance $R_I$ is electrically connected to a series connection on voltage conversion modules 20 via a supply line which has a parasitic inductances $L_I$. An electrical load or an electrical component 30 is connected respectively to each of the voltage conversion modules 20.

The battery system 10 provides a battery system voltage $U_S$ which is provided to the voltage conversion modules 20 via an inductance L. The battery system voltage $U_S$ is split between the voltage conversion modules 20 such that a partial voltage $U_T$ of the battery system voltage $U_S$ drops at each of the voltage conversion modules 20. The respective partial voltage $U_T$ is a function of the number of connected voltage conversion modules 20 and is scaled by way of this number of voltage conversion modules 20. The partial voltage $U_T$ dropping at a voltage conversion module 20 is transformed by means of the voltage conversion module 20 into a voltage suitable for the electrical component 30.

Figure 2:
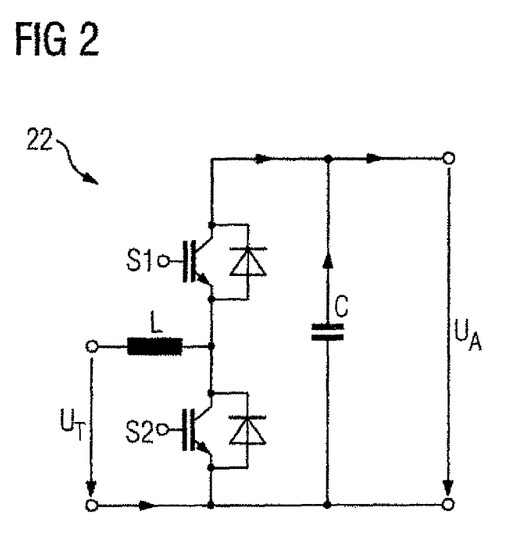
FIG. 2 shows a schematic diagram of an outline structure of a step-up converter.

Each of the voltage conversion modules 20 generally includes a step-up converter. Such a step-up converter 22 is illustrated in FIG. 2. The step-up converter 22 normally includes two switching elements S1 and S2, which can be designed as semiconductor switches, as well as a load capacitor C and a reactance coil L, also called a charging reactor. The step-up converter 22 is designed to convert the partial voltage $U_T$ dropping at the voltage conversion module 20 into a DC output voltage $U_A$, which is larger in size than the partial voltage $U_T$.

The disadvantage of the circuit arrangement according to FIG. 1 and thus according to the prior art is that the power output of each voltage conversion module 20 must be approximately equal. To this end the voltage conversion modules 20 electrically connected in series to one another, as well as their loads 30, are generally designed to be identical. In particular it is not possible to provide flexible power for an electrical component 30 connected to a voltage conversion module 20. Flexible power here means that for example for a defined period an increased voltage is present at one or more of the voltage conversion modules.

Another disadvantage is that the step-up converters 22 of the voltage conversion modules 20 are over-dimensioned for a peak power and thus for most operating points. The over-dimensioning calls for larger components which mostly also have a poorer efficiency in the remaining operating points. In addition, all semiconductor switches S1 and S2 of all step-up converters 22 are in principle mostly dimensioned such that they can compensate for the failure of at least one voltage conversion module 20. This over-dimensioning of the step-up converters 22 and of the semiconductor switches S1 and S2 increases the system costs and the space requirement, and impairs the overall efficiency of the system, above all in partial load operation.

It is the object of the present invention to implement a low-cost and efficient solution in order to supply electrical components flexibly with electrical energy.

It would therefore be desirable and advantageous to obviate prior art shortcomings and to provide a low-cost and efficient solution in order to supply electrical components flexibly with electrical energy.

SUMMARY OF THE INVENTION

According to one aspect of the present invention, a device supplying an electrical voltage from a battery system includes a series connection composed of a first battery submodule supplying a first battery submodule voltage and at least one second battery submodule supplying a second battery submodule voltage, a first voltage conversion module receiving the first battery submodule voltage and converting the first battery submodule voltage into an AC output voltage to be supplied to an electrical component connected to the first voltage conversion module, and a coupling device electrically connecting the first voltage conversion module to the first battery submodule and to the at least one second battery submodule such that the first voltage conversion module receives a sum voltage composed of the first battery submodule voltage and the second battery submodule voltage.

In other words, the coupling device is designed to electrically connect several voltage conversion modules such that a sum voltage of all relevant battery submodules is present at one of the voltage conversion modules. Thus a closed circuit can be formed which includes the coupling device, the first voltage conversion module and the battery system. Since the first battery submodule and the second battery submodule are connected in series inside the battery system, the battery system now provides a sum voltage. This sum voltage is obtained by adding the first battery submodule voltage and the second battery submodule voltage. This sum voltage is now present at the first voltage conversion module. The first voltage conversion module can supply a connected electrical component with energy by means of the sum voltage. The advantage of this is that a circuit arrangement which includes the battery system and the first voltage conversion module, to which an electrical component can be connected, can be particularly flexibly configured by means of the coupling device. A boost function, i.e. the possibility of providing flexible power for an electrical component by means of the sum voltage, multiplies the possible uses of the circuit arrangement. For this, no changes need in particular be made to the topology of the circuit arrangement.

According to an advantageous feature of the present invention, the first voltage conversion module may have a coil which may be electrically connected to the second battery submodule by means of the coupling device. This means that the coupling device additionally electrically connects the coil of the first voltage conversion module, which is electrically connected to the first battery submodule, to the second battery submodule. The sum voltage, which is produced by adding the first battery submodule voltage and the second battery submodule voltage, is now present at the coil. The coil is designed to store the electrical energy, which is provided by the first battery submodule and the second battery submodule, as magnetic energy. The magnetic energy stored in the coil is fed as electrical energy to an electrical component connected to the first voltage conversion module. As a result a larger volume of energy is available to the electrical component in the same time than a volume of energy which is merely provided by a single battery submodule, for example the first battery submodule.

According to another advantageous feature of the present invention, the coupling device may include a transistor. The coupling device can thus be configured particularly simply and inexpensively.

According to another advantageous feature of the present invention, the device includes a control device configured to control the coupling device. Thus an optimum-efficiency boost function can be provided as needed, if for example an electrical component connected to the first voltage conversion module requires increased power in the short term. The control device can for example be designed to detect an increased energy requirement of an electrical component which is connected to the first voltage conversion module and is supplied with energy from the first battery submodule, and then to activate the coupling device. The coupling device is designed to connect an additional battery submodule, for example the second battery submodule, to the first voltage conversion module, so that the electrical component can be supplied with energy from the first and the second battery submodules.

According to another advantageous feature of the present invention, the device may have at least one switching device which is arranged between the at least two battery submodules for the serial electrical connection of the first battery submodule and the at least one second battery submodule and/or for the galvanic isolation of the first battery submodule and the at least one second battery submodule. Due to the serial electrical connection of the at least two battery modules by means of the coupling device a higher overall voltage can be achieved, which is composed of the sum of the battery module DC voltages provided by the at least two battery modules. Due to the galvanic isolation of the at least two battery modules in respect of the relevant voltage conversion module by means of the coupling device the battery modules can for example be charged independently of one another, in particular without undesired interference coupling.

According to another advantageous feature of the present invention, the first voltage conversion module may include an inverter. On the output side of the step-up converter the voltage conversion modules can also have an inverter, among other things. The inverter is designed to convert a DC voltage into an AC voltage. Thus an electrical machine, for example an electric motor, can also be connected to the voltage conversion module as an electrical component and be supplied with energy from the first battery submodule or from both battery submodules.

According to another advantageous feature of the present invention, the device may have at least one third battery submodule supplying at least one third battery submodule voltage and the coupling device may be designed to electrically connect the first voltage conversion module to the first battery submodule and to the second battery submodule and to at least one third battery submodule, so that a sum voltage composed of the first battery submodule voltage and the second battery submodule voltage and the at least one third battery submodule voltage is present at the first voltage conversion module. The device can thus be expanded with additional battery modules if, for example, a larger amount of energy is required to operate one and/or more electrical components. By means of the coupling device the sum voltage, which is formed by adding the first battery module voltage, the second battery module voltage and the at least one third battery module voltage, can be fed to an electrical component which is for example connected to the first voltage conversion module. Thus the power level of the increased power provided by the boost function is scalable.

According to another advantageous feature of the present invention, the device may include at least one second voltage conversion module which can be electrically connected to the second battery submodule such that the second battery submodule voltage is present at the second voltage conversion module. A second electrical component, which can be supplied with the second battery submodule voltage, can be connected to the at least one additional voltage conversion module. The device is thus designed to supply several electrical components with energy, and at the same time to provide a boost function for individual components by means of the coupling device.

The invention also relates to a drive arrangement having at least one inventive device.

The invention also relates to a method for providing a voltage. The method includes providing a first battery submodule supplying a first battery submodule voltage and at least one second battery submodule supplying a second battery submodule voltage, providing a first voltage conversion module converting the first battery submodule voltage into an AC voltage, and connecting the first voltage conversion module to the first battery submodule and to the at least one second battery submodule such that the first voltage conversion module receives a sum voltage composed of the first battery submodule voltage and the second battery submodule voltage.

The preferred embodiments presented in respect of the inventive device and the advantages thereof apply mutatis mutandis also to the inventive drive arrangement and the inventive method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiment explained below is one preferred embodiment of the invention. However, in the exemplary embodiment the components described of the embodiment each represent individual features of the invention to be considered separately from one another, which each also develop the invention further independently of one another and thus are also to be regarded individually or in a combination other than the one shown as a component part of the invention. Furthermore, the embodiment described can also be supplemented by further features already described of the invention.

Figure 3:
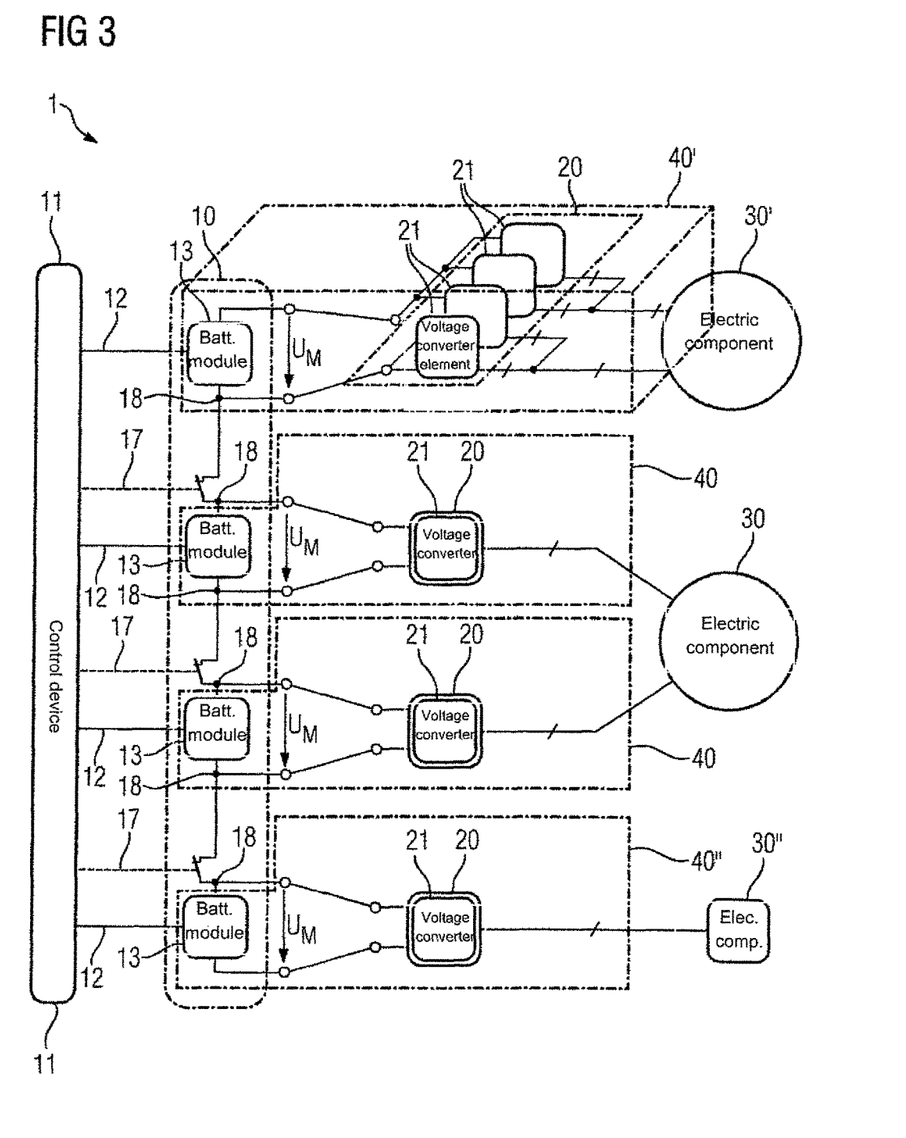
FIG. 3 shows a schematic diagram of a drive arrangement.

Turning now to the drawing, and in particular to FIG. 3, there is shown a drive arrangement 1 which can for example be arranged in a motor vehicle or in a wind turbine. In this case several battery submodules 13, also called battery stacks, are serially interconnected to a battery system 10 by way of switching device 17. The switching devices 17 can be controlled by means of a control device 11 using control buses 12. A battery submodule voltage $U_M$ drops at each of the battery submodules 13. Voltage taps 18, via which a voltage conversion module 20 can be connected to each battery submodule 13, are arranged between the individual battery submodules 13 of the battery system 10. The battery submodule voltage $U_M$ of a battery submodule 13 now drops at the voltage conversion module 20 which is electrically connected to the battery submodule 13. A battery submodule 13 and a connected voltage conversion module 20 each form a submodule 40, 40', 40". By means of the submodules 40, 40', 40" electrical loads 30, 30', 30" can be supplied with energy.

Within the top submodule 40', the voltage conversion module 20 includes several parallel-switched voltage conversion elements 21, to which an electrical component 30', in particular an electric motor, is connected. The parallel interconnection of the voltage conversion elements 21 is for the purpose of current scaling.

In the present exemplary embodiment a single electrical component 30 is connected to the two central submodules 40. This means that twice the submodule power is supplied to the electrical component 30. The serial interconnection of the submodules 40, to which the electrical component 30 is connected, is for the purpose of voltage scaling.

The bottom submodule 40" supplies an electrical component 30", which in the present case is designed as a DC load, with energy. The voltage conversion element 21 of the voltage conversion module 20 is here for example designed as a DC voltage converter.

FIG. 3 therefore shows that the battery submodules 13 can be loaded freely and independently of one another. In order now to be able to provide an increased voltage, in particular a peak power, for at least one of the voltage conversion modules 20 and thus for an electrical load 30, 30', 30", the drive arrangement 1 according to FIG. 4 can be expanded on the step-up converter side.

Figure 4:
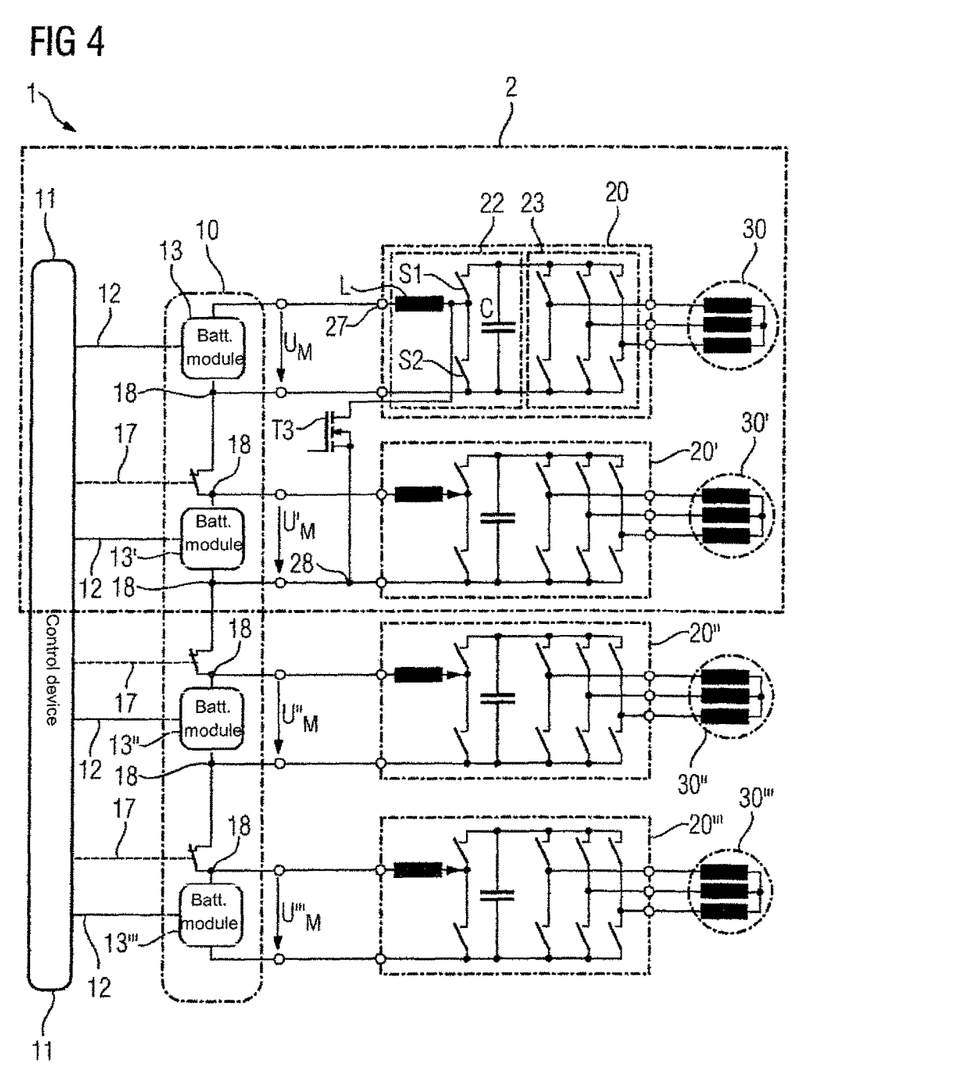
FIG. 4 shows a schematic diagram of an embodiment of the device according to the present invention.

FIG. 4 shows a device 2 for providing a voltage, which device 2 can be arranged in another embodiment of a drive arrangement 1. The device 2 includes a battery system 10 consisting of a series connection of several battery submodules 13, 13', 13", 13'". The battery submodules 13, 13', 13", 13'" can be designed to be identical. In the present exemplary embodiment the battery system 10 consists of the series connection of a first battery submodule 13, at which a first battery submodule voltage $U_M$ drops, a second battery submodule 13', at which a second battery submodule voltage $U_M'$ drops, a third battery submodule 13", at which a third battery submodule voltage $U_M''$ drops and a fourth battery submodule 13'", at which a battery submodule voltage $U_M'''$ drops. The battery submodule voltages $U_M$, $U_M'$, $U_M''$, $U_M'''$ can have identical voltage values. Other battery submodules can also be provided within the device 2.

Switching devices 17, which are actuated via control buses 12 by means of a control device 11, can be provided between the individual battery submodules 13, 13', 13", 13'". A switching device 17 is designed to electrically connect and/or galvanically isolate from one another two adjacent battery submodules 13, 13', 13", 13'".

Voltage taps 18, via which a voltage conversion module 20, 20', 20", 20'" can be connected to each of the battery submodules 13, 13', 13", 13'", can be arranged between the individual battery submodules 13 of the battery system 10. The voltage conversion modules 20, 20', 20", 20'" can be designed to be identical. In the present exemplary embodiment a first voltage conversion module 20 is connected to the first battery submodule 13, a second voltage conversion module 20' is connected to the second battery submodule 13', a third voltage conversion module 20" is connected to the third battery submodule 13'" and a fourth voltage conversion module 20'" is connected to the fourth battery submodule 13'", wherein at each of the voltage conversion modules 20, 20', 20", 20'" the battery submodule voltage $U_M$, $U_M'$, $U_M''$, $U_M'''$, is present, which is provided by the respective connected battery submodule 13, 13', 13", 13'".

An electrical component 30, for example an electrical machine, can be connected to each of the voltage conversion modules 20, 20', 20", 20'", and can be supplied with a first amount of energy from the battery submodule 13, 13', 13", 13'" connected to the respective voltage conversion module 20, 20', 20", 20'". Each of the voltage conversion modules 20, 20', 20", 20'" has a step-up converter 22, and an optional inverter 23. The step-up converter 22 includes two switching elements S1 and S2, a reactance coil L, also called a reactor L, and a capacitor C. The step-up converter of each voltage conversion module 20, 20', 20", 20'" is designed to convert the battery submodule voltage $U_M$, $U_M'$, $U_M''$, $U_M'''$ present into a first output DC voltage, the size of which is in particular greater than the size of the battery submodule voltage $U_M$, $U_M'$, $U_M''$, $U_M'''$. The first output DC voltage which is present at the capacitor C of the step-up converter 22 can be converted by means of the inverter 23 into a first AC voltage and supplied to the electrical component 30. The electrical component 30 can be designed as an electrical machine.

An exemplary embodiment will be presented below, in which a so-called boost function is provided. In this case for example the electrical component 30, which is connected to the first voltage conversion element 20 and supplied with the first amount of energy from the first battery submodule 13, can be fed a second amount of energy. The second amount of energy is in particular greater than the first amount of energy which is provided by the first battery submodule 13.

To this end a coupling device T3 is provided, which here is designed as a power semiconductor switch. A power semiconductor switch can be a transistor, in particular a MOSFET. The coupling device T3 has a first terminal 27 and a second terminal 28. The first terminal 27 of the coupling device 27 is connected to the reactance coil L of the first voltage conversion module 20, and the second terminal 28 of the coupling device T3 is connected to the negative pole of the second battery submodule 13'.

If the boost function is now provided, the control device 11 is designed to activate the coupling device T3, in particular the power semiconductor switch, such that a closed circuit including the coupling device T3, the first battery submodule 13, the second battery submodule 13' and the reactance coil L is produced. A sum voltage is now present at the reactance coil L of the first voltage conversion module L, and is produced by adding the battery submodule voltage $U_M$ of the first battery submodule 13 and the battery submodule voltage $U_M'$ of the second battery submodule 13'. The sum voltage which is present at the reactance coil L can be converted by means of the step-up converter of the first voltage conversion module 20 into a second output DC voltage, which can be larger in size than the first output DC voltage. The second output DC voltage can be converted by means of the inverter into a second AC voltage, which can be larger in size than the first AC voltage, and can be fed to the electrical machine 30.

Thus by using only one additional power semiconductor switch T3 a boost function can be implemented, by for example supplying the electrical machine 30 which is connected to the first voltage conversion module 20 via several battery submodules 13, 13' for a brief period.

The second battery submodule 13' and the voltage conversion module 20' connected thereto are designed to supply an electrical component 30 connected to the second voltage conversion module 20' with energy, while the second battery submodule 13' is used for the boost functions. This means that the second battery submodule 13' is designed to simultaneously provide energy for the first voltage conversion module 20 and for the second voltage conversion module 20'.

Provision can also be made for the first voltage conversion module 20 to be supplied with the energy from the first battery submodule 13, the second battery submodule 13' and the third battery submodule 13''. The coupling device T3 can then be connected to the third battery submodule 13'', so that at the reactance coil L a sum voltage is present which is produced by adding the first battery submodule voltage $U_M$, the second battery submodule voltage $U_M'$ and the third battery submodule voltage $U_M''$. The transistor then used of the coupling device T3 must in this case have a blocking voltage which is greater than the sum of an intermediate circuit voltage of the voltage conversion module 20 and the included battery submodule voltages $U_M'$, $U_M''$ of the other voltage conversion modules 20', 20''. Thus the reactance coil L of the voltage conversion module 20 is charged via more than one battery submodule 13, 13', 13'', which means the charging times are shorter and the step-up converter 22 of the first voltage conversion module 20 with a relatively small reactance coil L can supply more energy than when using just one battery submodule 13.

The corresponding procedure is to be followed if the first voltage conversion module 20 is to be supplied via more than three battery submodules. Provision can also be made for a boost function to be provided for the second voltage conversion module 20', for example. The coupling device T3 can then connect the reactance coil L of the second voltage conversion module 20' to at least two of the battery submodules 13'', 13'''.

Thus it is shown by the example how by using just one additional semiconductor switching element T3 a boost function can be integrated into a drive arrangement 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A device for supplying an electrical voltage, comprising:
   a battery system comprising a first battery submodule supplying a first battery submodule voltage having a first polarity and a second polarity, and at least one second battery submodule supplying a second battery submodule voltage having a first polarity and a second polarity, said first battery submodule and said at least one second battery submodule connected in series,
   a first voltage conversion module having a DC input comprising a reactance coil which is connected at a first terminal to the first polarity of the first battery submodule and at a second terminal to a switching network of the first voltage conversion module, the first voltage conversion module receiving at the first terminal the first battery submodule voltage and converting the first battery submodule voltage into an AC output voltage to be supplied to an electrical component connected to the first voltage conversion module, and
   a switched coupling device having a first terminal electrically connected to the second terminal of the reactance coil and a second terminal electrically connected to the second polarity of the at least one second battery submodule such that the reactance coil receives a sum voltage composed of the first battery submodule voltage and the second battery submodule voltage when the switched coupling device is activated.

2. The device of claim 1, wherein the coupling device comprises a transistor.

3. The device of claim 1, further comprising a control device configured to control the coupling device.

4. The device of claim 1, further comprising at least one switching device arranged between the first battery submodule and the at least one second battery submodules and electrically connecting the first battery submodule and the at least one second battery submodule or galvanically isolating the first battery submodule from the at least one second battery submodule.

5. The device of claim 1, wherein the first voltage conversion module comprises an inverter.

6. The device of claim 1, further comprising at least one third battery submodule supplying at least one third battery submodule voltage, with the coupling device configured to electrically connect the first voltage conversion module to the first battery submodule and the at least one second battery submodule and the at least one third battery submodule, such that the first voltage conversion module receives a sum voltage composed of the first battery submodule voltage and the second battery submodule voltage and the at least one third battery submodule voltage.

7. The device of claim 1, further comprising at least one second voltage conversion module electrically connected to the at least one second battery submodule and receiving the second battery submodule voltage.

8. A drive arrangement comprising
at least one device comprising
a battery system comprising a first battery submodule supplying a first battery submodule voltage having a first polarity and a second polarity, and at least one second battery submodule supplying a second battery submodule voltage having a first polarity and a second polarity, said first battery submodule and said at least one second battery submodule connected in series,
a first voltage conversion module having a DC input comprising a reactance coil which is connected at a first terminal to the first polarity of the first battery submodule and at a second terminal to a switching network of the first voltage conversion module, the first voltage conversion module receiving at the first terminal the first battery submodule voltage and converting the first battery submodule voltage into an AC output voltage to be supplied to an electrical component connected to the first voltage conversion module, and a switched coupling device having a first terminal electrically connected to the second terminal of the reactance coil and a second terminal electrically connected to the second polarity of the at least one second battery submodule such that the reactance coil receives a sum voltage composed of the first battery submodule voltage and the second battery submodule voltage when the switched coupling device is activated, and
at least one electrical component electrically connected to the output of the at least one device in one-to-one correspondence.

9. A method for providing an electrical voltage, comprising:
providing a first battery submodule supplying a first battery submodule voltage having a first polarity and a second polarity, and at least one second battery submodule supplying a second battery submodule voltage having a first polarity and a second polarity, said first battery submodule and said at least one second battery submodule being connected in series,
providing a first voltage conversion module having a DC input comprising a reactance coil which is connected at a first terminal to the first polarity of the first battery submodule and at a second terminal to a switching network of the first voltage conversion module, the first voltage conversion module receiving at the first terminal the first battery submodule voltage and converting the first battery submodule voltage into an AC voltage to be supplied to an electrical component connected to the first voltage conversion module, wherein the first voltage conversion module comprises a step-up converter having a reactance coil, and
connecting a first terminal of a switched coupling device to the second terminal of the reactance coil and connecting a second terminal of the switched coupling device to the second polarity of the at least one second battery submodule such that the reactance coil receives a sum voltage composed of the first battery submodule voltage and the second battery submodule voltage when the switched coupling device is activated.

* * * * *